Feb. 10, 1970  C. C. HOFFBERGER II, ET AL  3,494,035
DENTAL IMPACT TOOL
Filed Nov. 4, 1968  4 Sheets-Sheet 1
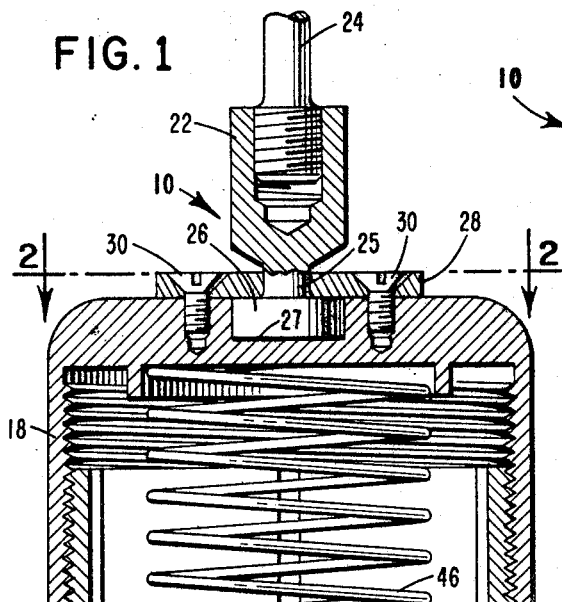
FIG. 1
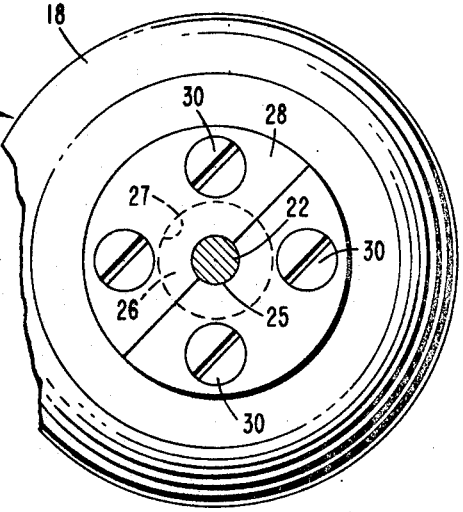
FIG. 2
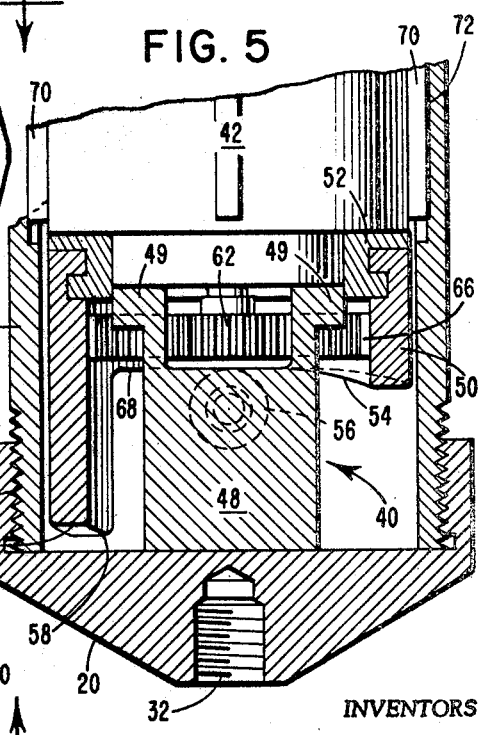
FIG. 5
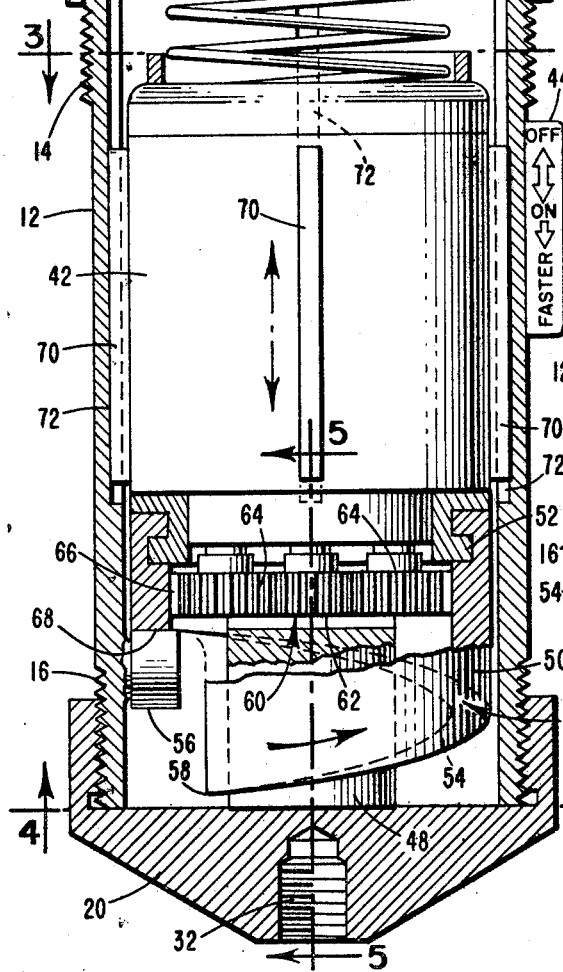
INVENTORS
CHARLES C. HOFFBERGER, II,
and HENRY B. EVERETT
BY *Sidney W. Russell*
ATTORNEY INVENTORS
CHARLES C. HOFFBERGER, II,
and HENRY B. EVERETT

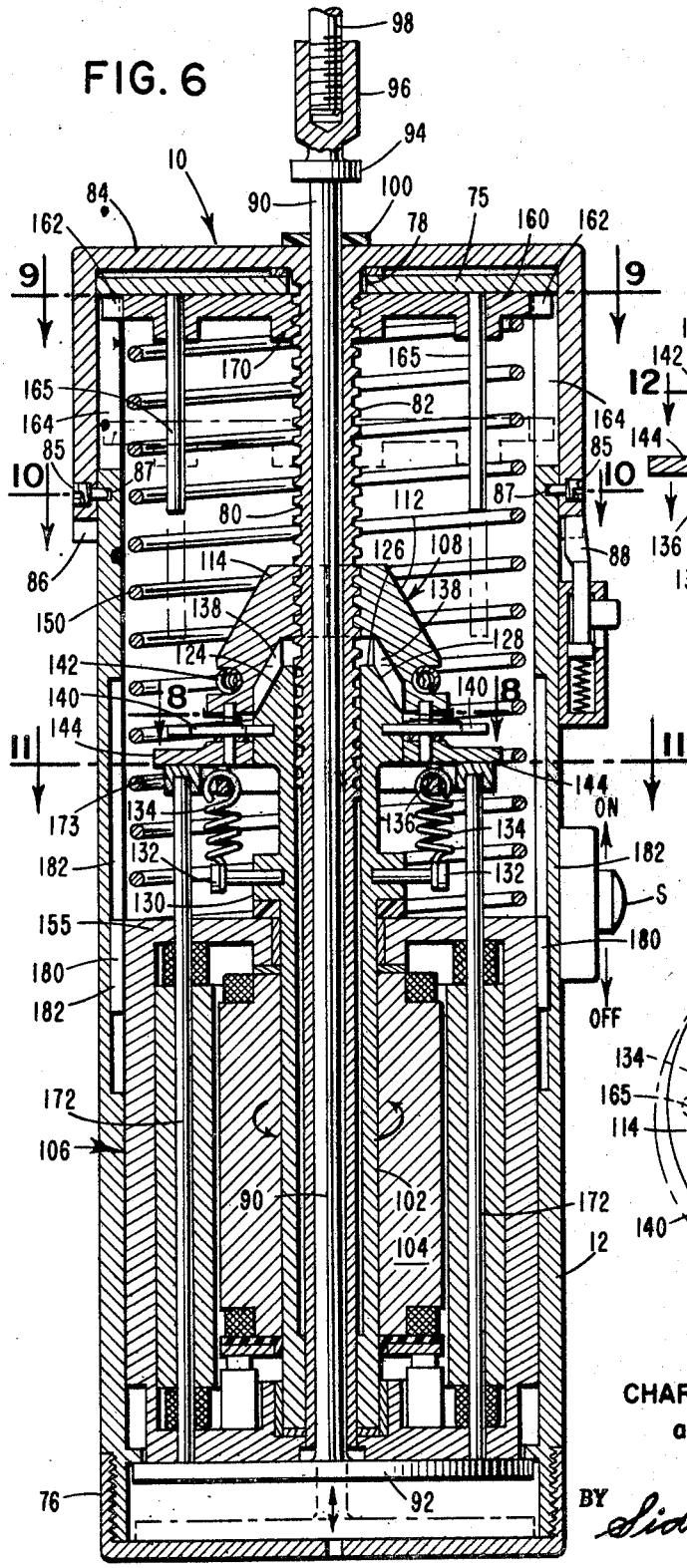
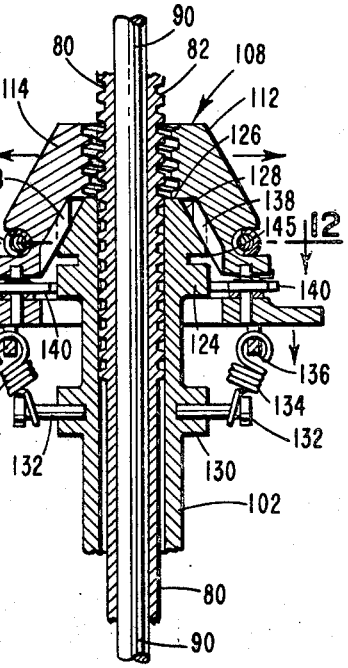
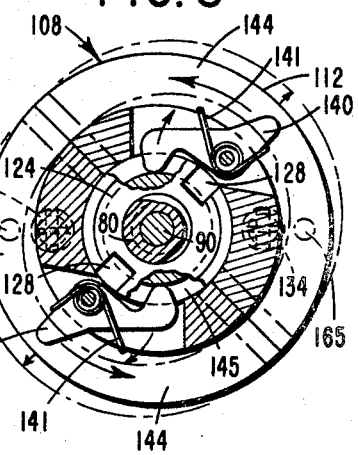
INVENTORS
CHARLES C. HOFFBERGER, II
and HENRY B. EVERETT
BY Sidney W. Russell
ATTORNEY

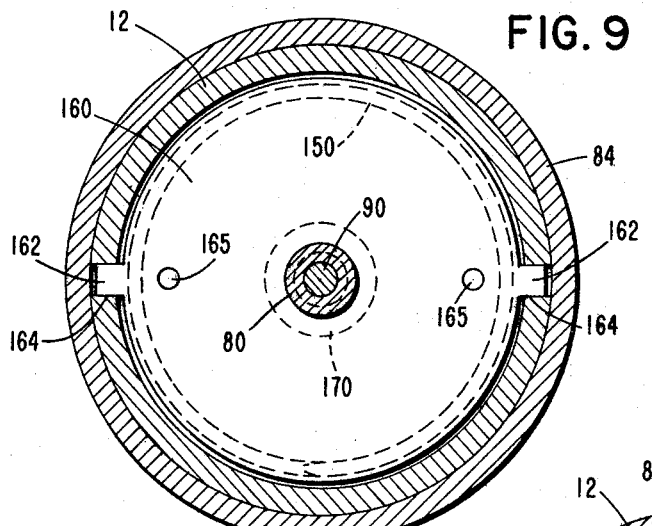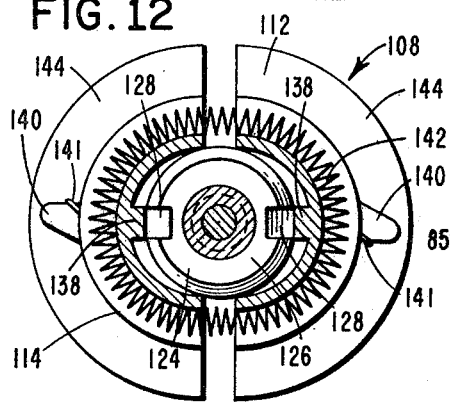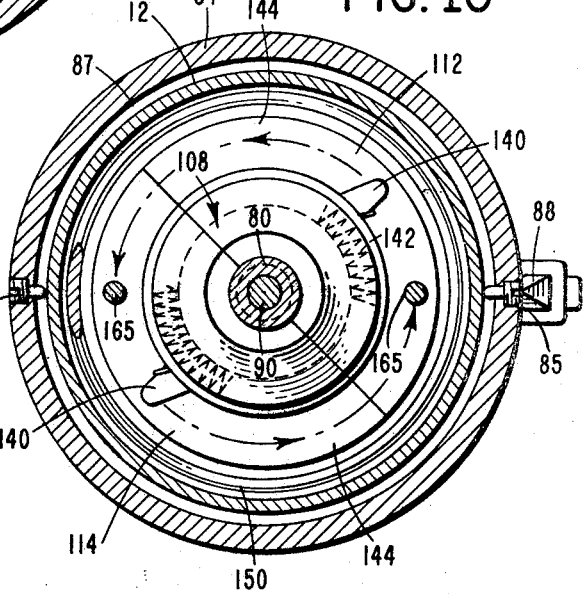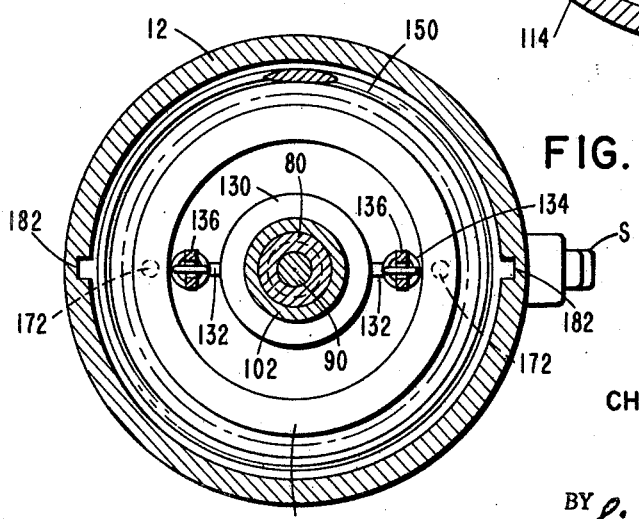

United States Patent Office 3,494,035
Patented Feb. 10, 1970

3,494,035
DENTAL IMPACT TOOL
Charles C. Hoffberger II, 7803 Crossland Road, Baltimore, Md. 20208, and Henry B. Everett, Arlington, Va.; said Everett assignor to said Hoffberger
Filed Nov. 4, 1968, Ser. No. 772,897
Int. Cl. A61c *3/00, 13/12, 15/00*
U.S. Cl. 32—53                9 Claims

ABSTRACT OF THE DISCLOSURE

An electrically operated instrument for use by dentists and surgeons in the removal of teeth and crowns or bridges, and alternatively for use as either a packing or bone chipping or cutting implement, wherein a series of impact strokes of predetermined amplitude are imparted to the dental or surgical tool, such impact strokes being responsive to the hammer effect of a slidable hammer means within the tool, imparting such impact strokes including a reciprocable motor structure within the tool casing which is caused to drive against an anvil that correspondingly transfers this impact force to the dental or surgical tool appended to one end of the casing.

---

This invention relates to an electrical device for use by the dentist or surgeon in the practice of either exodontia, prosthetics or orthopedic surgery, with a particularly useful function of the device being that of removal of crowns or bridges without undue discomfort to the patient.

Many different devices have been proposed by the prior art to achieve similar functions, yet in large part these have been unsuccessful because such schemes do not readily achieve the primary aim of tooth removal or cap or crown removal and this without extreme patient discomfort. Even with the use of local or general anesthesia this is in large part due to unnecessary distortion and damage to the alveolar socket or, in many instances, due to the complications resultant upon fracture of the tooth itself, thus requiring extended piece by piece removal of the remaining tooth—root structure. Also, such prior art structures are not adaptable to the alternative use of the present instrument—as a means for packing or bone chipping or cutting where the direction of impact force can be, in the present case, readily reversed.

The usual method of tooth removal or extraction practiced by most dentists involves a mere manual method, where a chosen and particular type of forceps is employed to grasp the tooth, oscillate or rotate it, or both, to break the root structure away from the surrounding periodontal membrane and, finally, a manual outward application of force requiring considerable effort, for final extraction.

Similarly, when it is necessary to remove a crown or bridge from a patient, the general procedure is, again, a purely manual operation, the dentist employing a usual type of hand instrument. This generally takes the form of a weighted cylinder, mounted on a slidable support for impact against a weighted base, and attached to the instrument being used. After such engaging instrument is attached to, e.g., the crown, the dentist drives the weight towards the end of the instrument and against its base. The resultant shock or force of impact is thus transmitted to the end of the instrument which has been inserted between cap and tooth structure. Again, and having in mind the periodic and relatively heavy blows upon the bone structure, the procedure is one not only resulting in great discomfort to the patient but also often accompanied by fracture of the crown or even tooth during such a process, thus perhaps entailing, again, piece by piece removal, this further adding to the patient's discomfort.

More recently, additional devices have been proposed in the art which employ a vibratory or oscillatory motion impulsed by an electrical current of relatively high frequency, to eliminate these generally used hand methods of extraction, et cetera, as briefly referred to in the foregoing. However, these methods have not generally come into popular usage, the primary reason for this residing in a fundamental difference between the instant invention and such prior art high frequency systems: Generally, the latter translate cyclic electrical current to high frequency oscillatory motion, as stated, but with such oscillations being of equal speed and force in each direction. In contrast, the instant invention requires an arrangement wherein only one uni-directional stroke of the electrohammer is used to generate the impact force. More specifically, the device of the instant invention, when operated, creates an impact force only in an outward or extractive direction (when used for extraction) with the other half of the movement backwards toward the tooth, representing a non-working or non-impact force having no, or relatively little, shock effect upon the patient. Further, the amplitude may be relatively small, and successive impacts are thus not unduly discomforting or disturbing to the patient. As indicated, this represents a fundamental distinction over either high or low frequency devices of the prior art wherein the vibratory motion represents force vectors of opposed direction. Such force vectors, in a direction directly against that which would implement, for example, the extraction of the tooth or removal of the involved bridge or crown, defeats the very purpose for which such vibratory or oscillatory motions are advanced, in prior schemes, in the first instance.

Accordingly, it is a primary object of the instant invention to provide an electrical dental/surgical instrument for crown removal, exodontia, filling emplacement or bone chipping, wherein the motor casing itself provides the hammering effect, being reciprocable for this purpose within the tool housing.

An additional object of the invention is to provide an instrument of the described type wherein only one-half of the reciprocable movement is employed, but that one-half is utilized as the uni-directional impact force of the involved implement, such working force always being exerted in only that direction to achieve the desired objective—away from the tooth for extraction, toward the tooth for packing or toward the bone for chipping or cutting.

Another object of the invention is to provide the described type of dental/surgical instrument which can be alternately used as a means for packing a filling into a tooth cavity, as the packing of amalgam where the dentist uses a hand implement to "hammer" this type of filling material into place. In this regard, and by a simple reversal of the instrument, the invention is readily adaptable to such use. For example, if the packing instrument is suitably affixed to the opposite end of the unit, rather than in the position to be described herein, then the impact force resultant upon each cycle will be in the direction of the tooth or toward the coronal portion thereof, the resultant quick and repeated impacts efficiently positioning the amalgam and again without the jarring and disturbing blows which ordinarily accompany such an operation. In this same regard, and in this same fashion, the instrument is extremely useful as a bone chipping instrument.

Finally, it is an object of the invention to provide a dental/surgical unit of the type referred to which may be produced at minimum cost and manufactured with the greatest of compactness, thus making it adaptable to ease of hand manipulation and which, perhaps more important, is suitable for its application to various types of dental instruments, either simple "hook" devices adapted to engage the crown or bridge of a patient for the removal thereof, or attachment to somewhat modified forms of the usual forceps with the extractive force of the instrument applied directly to the latter. Alternatively, such other instruments as the spatula for packing purposes or cutting blade for chipping puposes, may be attached to the instrument.

A more detailed description of the invention now follows with reference to the several drawings which illustrate two embodiments of same, and wherein:

FIGURE 1 is a longitudinal sectional view of one embodiment of the impact tool comprising the invention;

FIGURE 2 is a transverse sectional view taken along the line 2—2 of FIGURE 1;

FIGURE 5 is a view similar to FIGURE 1, in section, but taken in the direction of line 5 of FIGURE 1 and particularly illustrating the cam mechanism of the tool;

FIGURE 6 is a longitudinal sectional view of another modification or embodiment of the impact tool of the invention;

FIGURE 7 is a sectional view of the split nut arrangement in its disengaged or retracted position, as shown in FIGURE 6;

FIGURE 8 is a transverse sectional view taken on the line 8—8 of FIGURE 6;

FIGURE 9 is a sectional view taken on the line 9—9 of FIGURE 6;

FIGURE 10 is a sectional view taken on the line 10—10 of FIGURE 6;

FIGURE 11 is a sectional view taken on the line 11—11 of FIGURE 6; and

FIGURE 12 is a sectional view taken on the line 12—12 of FIGURE 7.

Figure 3:
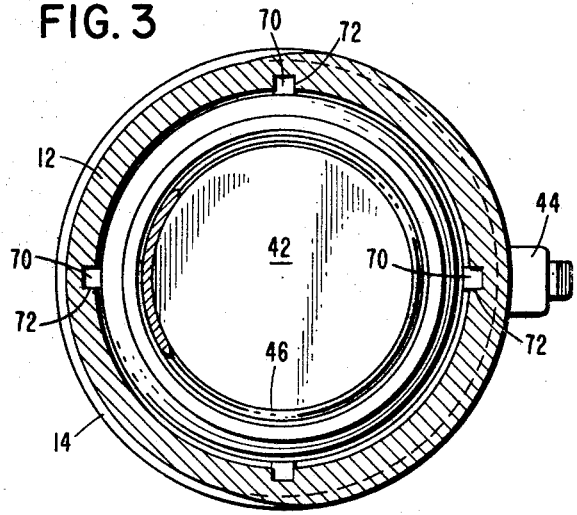
FIGURE 3 is a transverse sectional view taken along the line 3—3 of FIGURE 1.
Figure 4:
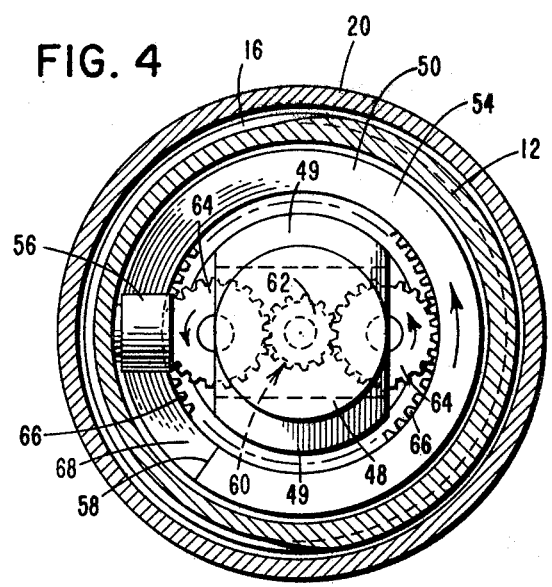
FIGURE 4 is a transverse sectional view taken along the line 4—4 of FIGURE 1.

Initially having reference to the first embodiment of the invention as shown in FIGURES 1 to 5, inclusive, the impact tool is generally indicated at 10. The working mechanism thereof is housed within a cylindrical tube 12, the later being provided with screw threads 14 and 16 at its respective ends. An upper threaded cap 18 engages the screw threads 14 in locking engagement, and a threaded cap 20 engages threads 16 in like fashion. As will be appreciated, these two caps 18 and 20 thus close the ends of the tube or cylinder 12.

A threaded tool holding socket 22 is rotatably mounted in the end of the upper cap 18 in the following manner: The closed end of a socket member 22 is provided with a lower circular flange 26 and the latter is attached, by a reduced diameter stem 25, to the referred to socket 22. Flange 26 is adapted to be received by a circular recess 27 formed in the top of the cap member 18. It is held therein by a split ring 28 secured to the cap 18 by the usual screws 30, and as illustrated in FIGURE 1.

The arrangement just described permits the tool 24 to be held in the socket 22 and to be rotated with respect to the cylinder 12, as will be well understood. The tool itself, element 24, is not shown in detail. However, it may terminate in the usual hook structure such as to permit the dental practitioner to engage its terminal end with a cap or crown to permit the latter's removal. In this regard, the impact force of the tool is downward as shown in FIGURE 1, so there is a pulling effect with each stroke of the hammer means to be described. On the other hand, that force may be exerted in an opposite direction, i.e., when the tool 24 is inserted in a like threaded aperture 32 of the opposed cap 20, the impact force is in the opposite direction and thus drives the tool in an opposite direction for chiseling, hammering or drilling operations.

Assembled within the cylinder 12 is a trip-hammer assembly generally indicated at 40. This is arranged to impart impacts of sudden, sharp, linear force to the tool 24, the force and frequency of such impacts being controllable within certain variable limitations. This action is accomplished by the following means:

A variable speed motor 42 is so circuited as to be controlled by a thumb push-pull switch 44, the motor being of the variable speed type and the switch thus being adapted to increase or decrease the speed or r.p.m. of the motor. The motor 42 is arranged to propel itself axially toward the upper cap 18 against a compression spring 46 which is positioned intermediate the inside surface of the cap 18 and the upper surface of the casing of the motor 42, and as clearly illustrated in FIGURE 1. At a certain and predetermined point the motor will be suddenly released, from its driven (upper) position, and this through a cam action drive that will be described in the following. It is then driven downwardly by thrust of the spring 46 toward the lower cap 20. A hammer 48 is attached to the motor 42, as will be understood particularly by reference to FIGURE 5. Such hammer, upon release of the motor from its upper position, and driven by the spring 46, strikes the cap 20 and thus imparts impacting force to the implement.

The motor 42 is driven upwardly against the helical spring 46 by a cylindrical cam 50 which is rotatably secured to the motor 42 by a flanged sleeve 52. Cam 50 is rotated by a planetary gear system generally indicated at 60, such gear system comprising a sun gear 62 attached to the motor drive shaft 63, and planet gears 64. The latter, in turn, mesh with a ring gear 66, which is made as an integral part of cam 50. The lower cam surface 54, which is inclined in spiral fashion, bears against a roller 56. This roller 56 is secured to the interior wall, in any suitable fashion, of the cylinder 12. Thus, when the motor shaft turns, the cam 50 is rotated past the stationary roller 56 with the result that he motor 42 and its attached hammer 48 are forced upwardly and away from the lower cap 20. When the cam surface 54 is rotated to the point 58 (see FIGURES 1 and 5) there is a sharp linear drop-off from roller 56 to the low point (designated 68) of the cam 50. At this point, and with the motor continuing operation, a new trip-hammer cycle commences.

The hammer 48 bridges the planetary gears, as shown particularly in FIGURE 5, and is attached to the motor by flanges 49. As shown in FIGURE 5, when the hammer is indicated as being in striking position, such hammer 48 extends to a point somewhat beyond the lower point 58 of the cam member so that the latter may not be damaged by striking the lower cap 20.

The motor 42 is prohibited from rotating with respect to the tube or cylinder 12 by means of longitudinal keys and key ways indicated respectively at 70 and 72, FIGURES 1 and 5, and which permit its longitudinal or axial reciprocation.

It will be understood that the compression force of spring 56 may be selectively adjusted by manually adjusting the upper screw cap 18. When rotated to its maximum extent (downwardly) the spring 46 will exert its maximum force or thrust; whereas, when reversely rotated so that the cap is extended outwardly with regard to the cylinder 12, the force of the spring 46 is lessened. As an alternate, the cap 18 may also be provided with a spring-detent means, not shown but well known to the art, to maintain it in a pre-selected position.

From the preceding description it will be seen that a comparatively simple mechanical arrangement has been provided by the foregoing modification of the invention. Such arrangement will not only permit variations in the rapidity or frequency of impacts due to the use of a variable speed motor, but also, the force of each of such impacts, accomplished by release of the motor housing, can be varied by increasing or decreasing the tension placed upon the helical spring 46 due to the relative positioning of the upper cap 18 with regard to the housing 12.

Another version or embodiment of this invention is illustrated in FIGURES 6 to 12 inclusive. Here approximately the same system is used for impact purposes: The motor is caused to move upwardly upon a central threaded element, when actuated, until it reaches a certain point. Its engagement with a column longitudinally centered within the housing is by means of a split nut arrangement; when a predetermined amount of travel has been accomplished by actuation of the motor, the two halves of the split nut each engage a trip rod, thus opening the nut, disengaging it from the center column, and thus permitting a spring bias means to force the motor, as a hammer, toward the bottom of the casing as it is shown in FIGURE 5. An impact is thus transmitted to the dental implement, and much in the same manner as heretofore explained with regard to the first version of the invention described with reference to FIGURES 1 to 5, above.

In referring more particularly to FIGURES 6, 7 and 8, the mechanism for this version of the impact tool is housed in a like cylindrical casing 12, the latter being closed at one end by an integral plate 75 and at the other end by a removable cap 76 threaded to the casing 12, as indicated. A hole or aperture 78 in the plate 75 accommodates a tube 80 which is threaded for a part of its length (approximately the upper half thereof) as indicated at 82. This threaded tube extends into the hollow center of the casing or cylinder 12 and is made integral with a rotatable cap 84 which surrounds one end of the cylinder 12. Such cap has, at its open end, teeth or serrations 86 which are engaged by a spring-bias latch 88 mounted on the side of cylinder 12 below the teeth 86. The cap 84 is rotatably positioned for reasons that will be later explained.

The referred to externally threaded tubular member 80 surrounds a high tensile strength steel pulling rod 90. The latter is provided with a circular disc 91 at its upper end near the cap 76. At the end opposite such disc is a stop collar 94 surmounted by a threaded socket 96 for any appropriate tool such as indicated at 98. The tool may be of the same type as hereinbefore described, with respect to the first embodiment of the invention.

Surrounding the rod 90 on the top of the cap 76 is positioned a nylon or Teflon washer 100 which serves as a resilient bumper means upon the downward or impact stroke of the mechanism.

As shown in FIGURE 6, the rod 90 is extended partially toward its uppermost position, or in the direction uppermost in the cylinder preparatory to the application of downward impact force upon the tool 98.

The threaded tube 80 has a smooth internal bore which permits of free rotary and longitudinal or reciprocal motion of the rod 90. Surrounding the threaded tube 80 is positioned an electrically driven shaft 102 which is secured to the rotor 104 of an electric motor generally indicated at 106. A split nut, generally indicated at 108, is composed of half segments 112 and 114. These are retractably attached to the upper end of the shaft 102. The upper end 124 of shaft 102 is larger in diameter than the lower end thereof and has a frusto-conical end 126 with two diametrically opposed grooves 128 formed therein. Spaced below the upper end 124 is an annular collar or flange 130 in which are mounted two radially disposed pins 132 which serve as anchors for one end of tension springs 134. These latter are connected at their opposite ends to depending ears 136 located on the bottom edge of each of the split nut segments 112 and 114. Split nut segments 112 and 114 are further provided with keys 138 which are received by, and can slide in, grooves 128 in the shaft end 124. Split nut 108 is held in its threaded engaging position, as seen in FIGURE 6, by two spring bias latch arms 140, the spring bias being accomplished by clip spring 141 (see FIGURE 8).

A girdle spring 142 resiliently urges the split nut segments together. Spring 142 is disposed in an annular groove formed in the split nut segments. Integral with a split nut segment is a flange 144 the purpose of which will be later described.

When the electrical motor 106 is actuated the split nut is driven around the threaded portion of tube 80 and as it rotates it pulls itself upwardly along the tube against the spring pressure of a compression spring 150 which extends from the top of the motor casing, here indicated at 155, to an upper adjustable spring retaining disc 160. The latter, the spring retaining disc 160, has two ears or dogs 162 positioned diametrically opposed to each other and these ears are held in longitudinal slots 164 formed in the housing 12.

Disc 160 also threadedly engages the tube 80 as at 170. It is also obvious that rotation of the cap 84 causes the threaded tube 80 to rotate within the threaded portion 170 of disc 160 and thereby causes disc 160 to move axially with respect to the electric motor.

Moving the disc 160 closer to the motor compresses the spring 150 and will thus increase the force asserted by the spring as the motor drives itself closer to the disc 160.

Depending from the underside of disc 160 are two trip rods 165, the purpose of which is to trip the latch arms 140 and thereby permit the two split nut segments 112 and 114 to be pulled downwardly and outwardly by reason of the grooves 138 and springs 134. When this occurs the split nut segments are snapped away from the threads of member 80 and the whole motor assembly is thus quickly accelerated by spring thrust down the tube 80 until it strikes the disc 92 to which the rod 90 is attached. The impact force so generated is thus directly imparted to the rod 90 and consequently upon the tool or implement 98.

In order to restore the split nut segments to their former position, as shown in FIGURE 6, two push rods 172 are provided. These rods are slidably received in suitable bores in the stator structure of the electric motor and are of greater length than that of the motor so that when the motor strikes disc 92 they are pushed upwardly against flanges 144 until the latch arms 140 engage their respective notches in the drive shaft end 124. This action takes place against the force of springs 134 and, in effect, recocks the split nut for another cycle.

It should likewise be noted with regard to this second embodiment just described, a fixture for the dental tool (not shown) may similarly be installed in the base 76, and for the purpose of utilizing the tool as an impactor or hammer, just as described with regard to FIGURES 1 to 5 hereof.

Further, although this second version of the invention may be somewhat more complex, mechanically speaking, than the first embodiment, it is fully equivalent insofar as the primary concept of the invention be concerned—that is, use of the weight of the motors means itself to create the impact force in the first instance. In both versions of the invention the motor is reciprocably mounted within the housing and adapted for longitudinal or axial movement with an interconnection between the motor and the housing of such type that upon actuation of the motor the latter propels itself toward one end of the housing and also toward a suitable spring bias means, thus to compress the latter. At a predetermined point the motor is "unlatched," as it were, from its position of stress against such spring bias and at this time its sudden release causes it to be propelled with considerable force against the opposite end of the casing. The device is so designed as to leave to the operator the ultimate choice with regard to two factors: Firstly, utilizing an electrical motor subject to variable r.p.m., the frequency of the series of impacts can be altered and, secondly, the operator can adjust the force of those individual and repeated impacts by compression of the spring media which will then exert more thrust upon unlatching or release of the motor.

Mention has been made in the foregoing of the use of the invention as a means for the packing of such material as amalgam into a tooth cavity. Similar advantages of the instrument will be apparent to the practitioner, such as its use as a "pick" for the removal of extraneous cement when a filling or other prosthetic step has been completed. In the instant case, all that need be done is to secure such an applicable implement into the reverse end of the base of the instrument, as same is shown in FIGURES 1 and 6. Here a threaded aperture is also provided for insertion of the dental tool in the same manner as that element is shown in place in the reverse or upper end of the instrument. Accordingly, if such a device as a spatula or other dental instrument be used for the packing of a given dental material, that implement, as stated, can be secured to the lower end of the unit. In such case the impact force of course travels through the hammer and directly to the implement and when so used in this manner the driving force is thus obviously toward the center axis or coronal end of the tooth. In either practice, the impact force will be of the same intensity having in mind of course optional adjustment as to the amount of spring tension or bias that the operator may desire.

Also, and as pointed out above, the instrument is useful in dental or other surgery when employed in conjunction with a chisel or other type of cutting implement, these tools likewise being mounted in the lower threaded base.

We claim:

1. In a dental impact mechanism, a housing, an electric motor means having a drive shaft, means in interconnection with said drive shaft to propel said motor means toward one end of said housing upon rotation of said drive shaft, means locking the stator of said motor means against rotational movement with respect to said housing but permitting axial movement thereof, bias means opposing said motor movement and exerting thrust toward the other end of said housing, means to release said interconnecting means at a predetermined point of travel of said motor means toward said one end whereby said bias means forces said motor toward said other end to strike said other end with impact force and means positioned at least at one end of said housing to interconnect an impact dental tool thereof, to thereby transmit said impact force to said dental tool.

2. The invention as defined in claim 1 wherein said means to propel said motor means toward one end of said housing includes a cam roller, a cam mounted upon said motor means for rotary movement with respect thereto, said cam having a tapered helical surface for engagement with said cam roller, and gear means interconnecting with said drive shaft to drive said cam over said cam roller whereby said motor means is impelled toward said one end.

3. The invention as defined in claim 2 wherein said bias means comprises a helical spring intermediate said one end and said motor means.

4. The invention as defined in claim 3 wherein said one end comprises a cap provided with thread engaging means to engage said housing, and said spring is positioned against said cap, whereby said tension of said spring may be varied.

5. The invention as defined in claim 4 wherein said motor means is of variable speed type to thereby vary the frequency of impact of said dental tool.

6. The invention as defined in claim 2 wherein said housing is provided with a dental tool connection device at each end thereof.

7. The invention as defined in claim 1 wherein said means to propel said motor means toward one end of said housing includes an externally threaded tubular member, a threaded split nut engaged with said motor means and adapted for threaded engagement with said tubular member, means interconnecting said drive shaft with said split nut thereby to rotate said split nut upwardly upon said tubular member, and means to open and disengage said split nut from said tubular member, thereby to permit said motor to strike said other end with impact force.

8. The invention as defined in claim 7 wherein said split nut is normally spring biased in said threaded engagement position and said means to open and disengage said split nut comprises latch arms on each segment of said split nut and trip rods positioned thereabove engage said latch arms upon motion of said split nut toward said one end thereby to open and disengage said split nut from said threaded tubular member.

9. The invention as defined in claim 8 wherein said bias means comprises a helical spring intermediate said one end and said motor means.

References Cited

UNITED STATES PATENTS

| 376,581 | 1/1888 | Byrnes | 32—53 |
| 408,883 | 8/1889 | Lacavalerie et al. | 32—53 |
| 1,817,571 | 8/1931 | Levy | 32—53 |

ROBERT PESHOCK, Primary Examiner